Feb. 12, 1952 — R. J. DIPPY — 2,585,374
WIRELESS NAVIGATION SYSTEM
Filed July 18, 1947 — 3 Sheets-Sheet 1

Inventor
Robert James Dippy
By
Cameron, Kerkam & Sutton
Attorneys

Feb. 12, 1952 R. J. DIPPY 2,585,374
WIRELESS NAVIGATION SYSTEM
Filed July 18, 1947 3 Sheets-Sheet 2
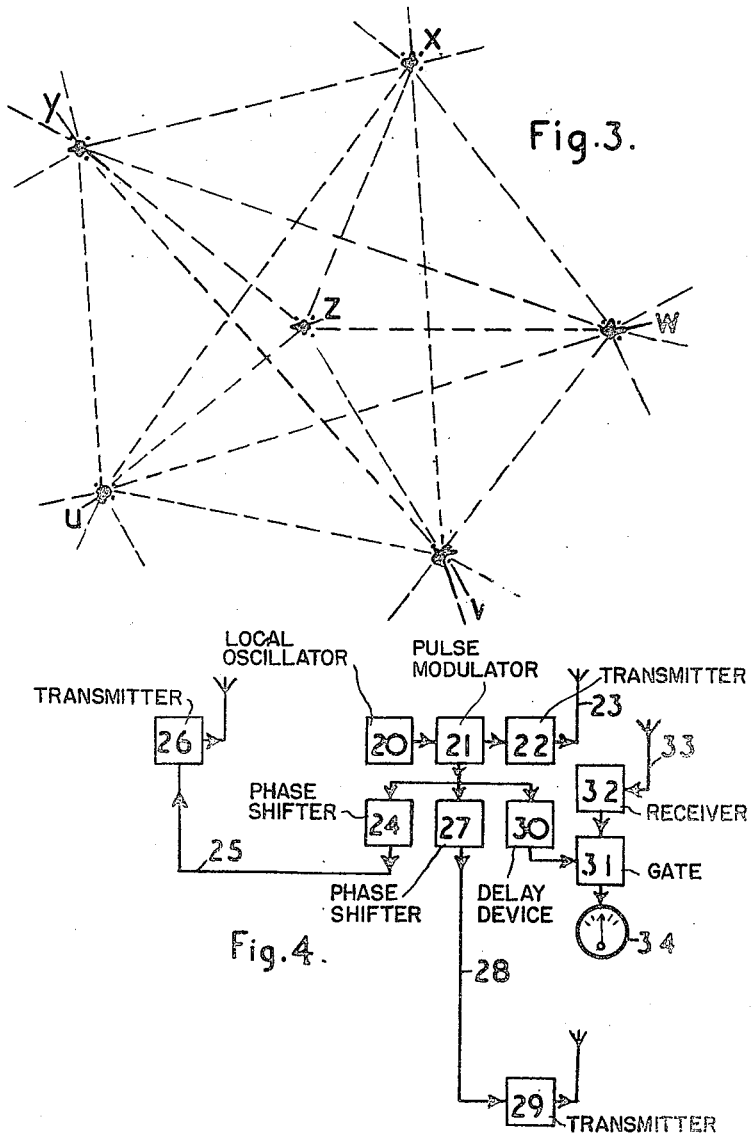
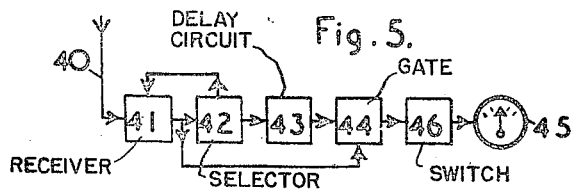

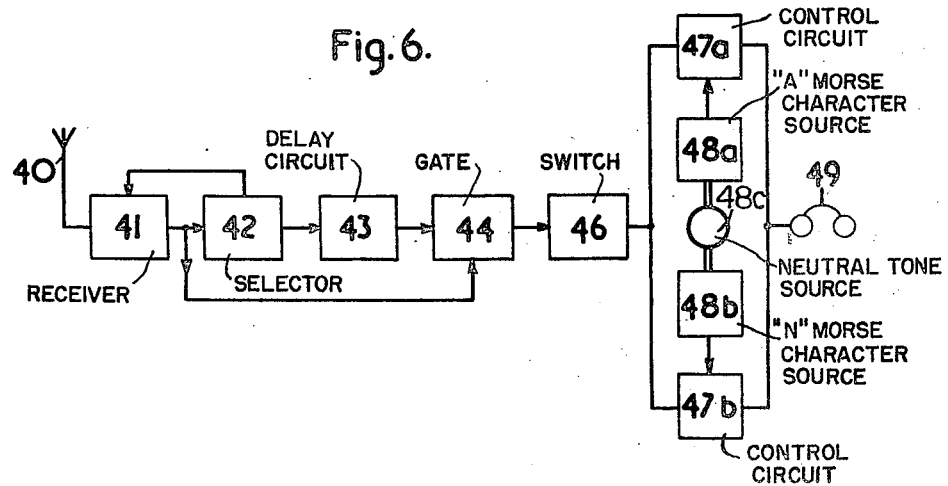
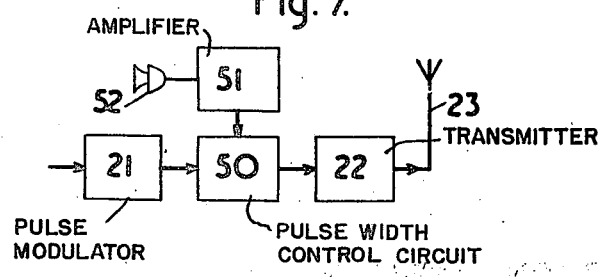
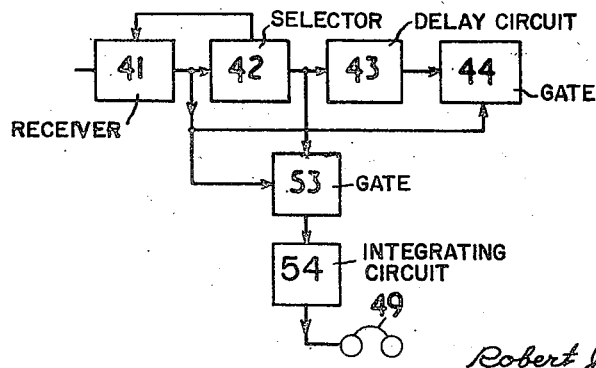

Patented Feb. 12, 1952

2,585,374

UNITED STATES PATENT OFFICE 2,585,374

WIRELESS NAVIGATION SYSTEM

Robert James Dippy, Old Bexley, England

Application July 18, 1947, Serial No. 761,966
In Great Britain March 15, 1945

Section 1, Public Law 690, August 8, 1946
Patent expires March 15, 1965

10 Claims. (Cl. 343—103)

This invention relates to wireless signalling arrangements and is more particularly concerned with arrangements for aiding the navigation of mobile craft such as aircraft.

It has previously been proposed to set up a series of wireless beacon stations located at a number of convenient navigational points or traffic centres such as in the vicinity of airports and landing grounds and arranged in such manner that they provide one or more radio beams or course indications directed towards neighbouring traffic centres such as airports and landing grounds whereby aircraft and the like may be navigated between the various traffic centres by the process of following the appropriate beam or course with the aid of suitable radio receiving apparatus carried by the mobile craft. A particular example of such an arrangement is to be found in the "radio range" system employed extensively in the United States of America and wherein a plurality of beacon transmitters located at appropriate geographical positions each radiate in such manner as to provide a number of radio courses, usually four, each suitably directed towards other navigational or traffic centres to or from which traffic is required to pass.

Such arrangements as heretofore proposed suffer from a number of disadvantages and difficulties. Among these are (i) the difficulty of providing a separate radio beam or course directed from each beacon transmitter towards more than four adjacent traffic centres, (ii) the necessity of using a different fundamental transmission frequency for each of the beacon transmitters within a given area so as to assist in their mutual identification and to avoid confusion by simultaneous reception of two beacon transmissions by a mobile craft and (iii) the occurrence of the phenomena of beam or course "bending" and the associated phenomena of beam or course "splitting" due to topographical and ionospheric conditions, particularly noticeable when interlocked signals, such as those of the "A" and "N" Morse characters, are used to assist delineation of the mid-beam or course direction.

The present invention has for its principal objects the provision of a simplified radio navigational aiding arrangement in which a common fundamental frequency may be used for all the various beacon transmitters, in which any desired number of courses are provided simultaneously by each beacon and in which errors due to the aforesaid "bending" and "splitting" phenomena are avoided.

According to one feature of the present invention each of a desired number of traffic centres is provided with a beacon arrangement comprising at least two and preferably three pulse-modulated transmitters spaced around and in the vicinity of the centre to or from which traffic is required to be directed, said transmitters being so arranged that the pulse signals radiated by the first or main transmitter are repeated by the other transmitter or transmitters after a predetermined and constant delay time-interval or intervals whereby there is set up in the space around said transmitters a series of substantially radial course lines each characterized by a particular value of time-interval between reception of a pulse from said first transmitter and the repeated or counterpart pulse from the said further transmitter or transmitters.

Three transmitters are desirable, set up respectively at the corners of a right-angled isosceles triangle and with the transmitter located at the right-angled corner operating as the first or main transmitter whose pulses are repeated by each of the two further stations after chosen and respectively different time-delay intervals. All the transmitters of each beacon arrangement and preferably all of the various beacon arrangements employed operate upon a common radio transmission frequency, identification of the various beacon arrangements in the latter case being provided for by the allocation of different pulse recurrence frequencies to each beacon arrangement within a given area.

The arrangement of each beacon of the present invention is in many respects similar to the so called "Gee" wireless tranmission system described in my copending application Serial No. 527,017, filed March 17, 1944, wherein a pulse signal transmitted from a first radio transmitter is followed at a predetermined time-interval by a counterpart signal from a second transmitter, the transmitters being spaced apart at fixed locations so that the pair of pulses produce in the space around said transmitters a series of hyperbolic locus lines along each of which the time-interval between the reception of the related pulses will be a particular constant value. The manner of operation of the beacons is likewise similar to that described in detail in copending application Serial No. 527,018, filed March 17, 1944. Whereas, however, the arrangements described in the aforesaid copending applications are directed principally towards fixing the position of a mobile craft over a wide area by the substantially simultaneous observation of the two time-delay intervals related to the signals from a single group of three transmitters having a wide spacing and so situated relative to one another that their respective course or locus-lines intersect at an appreciable angle over said wide area, the present invention is concerned, not with position fixing or the provision of two series of course or locus-lines intersecting at an appreciable angle over said wide area, but, on the contrary, with providing an arrangement by which a series of course or locus-lines are directed substantially radially outwards from a relatively small area forming the said traffic centre.

By constructing each beacon arrangement of the present invention with substantially identical layout, i. e. with the same transmitter spacing and orientation with respect to magnetic north and with the same chosen time-delay intervals, it is possible to allocate common bearing angles to course lines having identical delay time-intervals from each of the various beacon arrangements provided throughout the system.

The pulse recurrence frequency of each beacon arrangement is conveniently controlled by a master oscillator located at the first or main transmitter. This oscillator controls the operation of a pulse modulator circuit the output of which, in addition to effecting modulation of the associated main transmitter, is also applied by way of separate adjustable delay networks or phase-shifting devices to each of the two further or satellite transmitters by way of land lines. Arrangements are also provided at the main transmitter for receiving the counterpart pulses radiated by the satellite transmitters and for measuring the respective time-delays and adjusting them to the required value.

According to another feature of the invention apparatus for use in a mobile craft, such as an aircraft in conjunction with a "Gee" type radio navigational aiding system and particularly for use in conjunction with a navigational aiding arrangement as recited above comprises a suitable radio receiver and means whereby the received pulse signals emanating from a selected satellite transmitter may be applied to a centre-zero type meter firstly in such a manner as to cause an indication in one sense and immediately afterwards in such a manner as to cause meter indication in the opposite sense, the instant of change-over from one manner of application to the other being controlled by calibrated and adjustable timing means to occur at a chosen value of delay time-interval following the instants of reception of each signal pulse emanating from the main transmitter of the "Gee" system whereby pulse signals from a satellite transmitter arriving in synchronism with said change-over operations will result in a balanced or null meter indication whereas the arrival of similar signals arriving either before or after said change-over operations will result in meter indication in one or other of the opposite senses.

In a particular form of navigational apparatus according to the invention the received signal output from a suitable radio receiver is arranged to be applied to a centre-zero meter by way of a gate-valve device which is controlled in its operation by the voltage output of selector means also supplied with the received signal output from said receiver by way of a calibrated variable time-delay device, said selector means being such that it provides a controlling voltage change to said gate-valve device in response only to and in time-locked relationship with each received pulse of a repetitive pulse signal having a chosen pulse-recurrence frequency and said gate-valve circuit being such that, when operated by the voltage change from said selector means, it first allows momentary application of any received signal to said centre-zero meter in a manner causing meter indication in one sense and then effects a change-over operation so as to allow a similar momentary application of any received signal to said meter in a manner causing meter indication in the opposite sense, the instant of said change-over operation occurring at a time-instant after the reception of each pulse of the selected repetitive pulse signal which is accurately determined by the setting of said calibrated variable time-delay device. Adjustment of said calibrated variable time-delay device to obtain a null meter indication provides an indication of the time-delay between main and counterpart signals while, conversely, adjustment of said device to a chosen value and subsequent navigation of the mobile craft to maintain a null indication on the meter in the manner of a "left-right" indicator serves to direct such craft along a chosen course line.

In order that the above and further features of the invention may be more readily understood one embodiment thereof will now be described by way of example with reference to the accompanying drawings in which:

Figure 1 is a diagram showing the disposition of the various course lines around a three-transmitter radio beacon arrangement according to the present invention.

Figure 2 comprises a series of graphs (a)–(d) showing respectively the relative timing of the various signals received by a mobile craft from the transmitters of the arrangement shown in Figure 1 when such craft is in a number of different positions around the beacon.

Figure 3 illustrates diagrammatically how a plurality of beacon arrangements according to the present invention can each provide course lines leading directly to each and every one of the remaining beacon arrangements within the operative range of the receiving apparatus on the mobile craft.

Figure 4 is a block schematic diagram of the apparatus provided in a beacon arrangement such as that shown in Figure 1.

Figure 5 is a block schematic diagram of one preferred form of apparatus provided in a mobile craft for co-operation with a "Gee" type radio navigational aiding system and in particular with the beacon arrangements shown in Figures 1 and 3.

Figure 6 is a block schematic diagram similar to Figure 5 showing a modified apparatus arrangement for a mobile craft for giving an audible and interlocked A–N course-signal indication.

Figures 7 and 8 show respectively in block schematic form the main transmitter and mobile craft receiver arrangements as modified for providing a speech communication channel from the main transmitter to the mobile craft in addition to the normal course indications.

Figure 1:
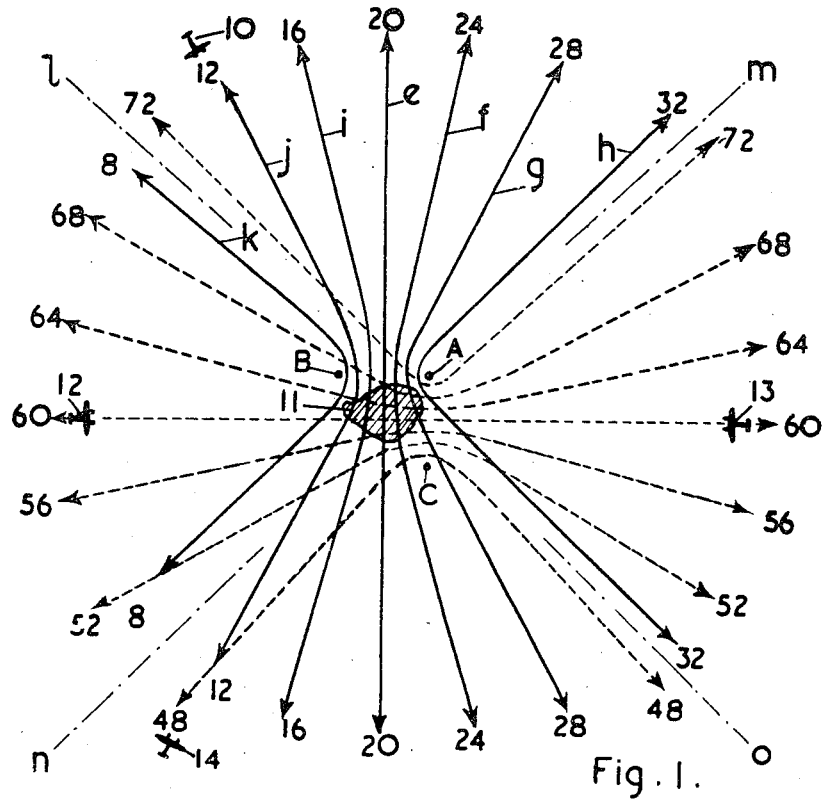

Referring first to Figure 1, A indicates a fixed ground transmitter arranged to radiate a carrier wave having a frequency of, say, 40 mc./s. or higher and modulated to provide a continuous series of short pulses each of, say, 1 micro-second duration occurring at a constant pulse recurrence frequency of, say, 100 per second. B indicates a second fixed ground transmitter located at a distance of, say, 3 miles from transmitter A and arranged also to radiate a pulsed carrier wave of the same radio transmission frequency as A. The modulation of this transmitter B is controlled by the pulse modulation of transmitter A in such a manner that it radiates a counterpart pulse at a predetermined and precisely adjustable interval of time, say 20 microseconds, after each corresponding pulse radiated by transmitter A.

As already described in the aforesaid copending applications Serial Nos. 527,017 and 527,018 such an arrangement results in the provision of a series of hyperbolic locus-lines in the space around the transmitters, along each of which the time-interval between the reception of a pulse from transmitter A and the reception of the repeated or counterpart pulse from satellite transmitter B will have a constant value which is different from that of the other locus lines and is therefore characteristic of that particular locus-line. For example, with the delay of transmitter B after transmitter A equal to 20 microseconds as quoted above, at all positions along the line $e$ which forms the perpendicular bisector of the base line AB, the measured timedelay between related "A" and "B" transmitter pulses will be 20 micro-seconds since the distance from any chosen point to transmitters A and B will be equal and the delay in consequence will be equal to that imposed between A and B transmitter pulses.

Along other locus-lines such as those $f$, $g$ and $h$ nearer to the transmitter A the measured time-delays will be greater e. g. 24, 28 and 32 micro-seconds respectively, due to the progressively greater distance of transmitter B from any chosen point on such lines than that of transmitter A. On the other side of line $e$, a series of further locus lines such as $i$, $j$ and $k$ will have respective time-delays which are progressively less than that of line $e$, e. g., 16, 12 and 8 microseconds, due to the lesser distance of any point thereon to transmitter B than to transmitter A.

If now a mobile craft such as the aircraft 10 be provided with means for measuring the aforesaid time-delay it may be navigated along any chosen one of the above described locus-lines by the simple expedient of keeping the measured time-interval constant, at the chosen value. It will be noted that the above described locus-lines, although strictly speaking hyperbolic in form, nevertheless become, at distances of more than a few miles from the mid-point of the base-line AB, a series of radially disposed and substantially straight lines and accordingly are suitable for use as "course" lines to or from a traffic centre such as an airport or landing ground indicated at 11.

With a single pair of transmitters as described the change of time-delay interval with respect to change of bearing direction becomes smaller in value as the angle between said bearing direction and the perpendicular bisector line $e$ increases and, at angles of greater than 45° to said bisector, may become so small as to render the accuracy insufficient. To overcome this difficulty a third transmitter C is provided disposed on a base line which, with respect to transmitter A, is substantially at right angles to the previous base line AB. This third transmitter is arranged in similar manner to the transmitter B whereby it radiates further counterpart-pulses to those of transmitter A after a predetermined and precisely adjustable time-interval. This latter delay interval is made of such value that the minimum possible timedelay in the reception of a pulse from transmitter C after the related pulse from transmitter A is always greater than the similar maximum possible delay of reception of a pulse from transmitter B after the related pulse from transmitter A wherever reception and measurement is effected around the beacon. By this means all four quadrants will be satisfactorily covered, two (between lines $l$ and $m$ and between lines $n$ and $o$) by the transmitter pair A, B and two (between lines $l$ and $n$ and between lines $m$ and $o$) by the transmitter pair A, C.

Such an arrangement also provides for positive resolution of the ambiguity, which can arise when only one pair of transmitters is employed, as to which quadrant the mobile craft is located in. This can arise particularly in situations such as those indicated at 12 and 13. In the absence of other information, the navigator of the mobile craft would be uncertain whether he was located at 12 or 13 since both places would give the same delay-interval indication relative to the pair of transmitters A and C.

The manner in which this resolution may be effected will be described with reference to Figure 2 which shows in graphical form the relative timings between the related A, B and C pulses for positions such as 10 and 14 on the same locus or course line $j$ provided by the transmitter pair A and B and for positions such as 12 and 13 on the line $p$ provided by the transmitter pair A and C. In this graph horizontal distances represent timedelay in micro-seconds, according to the scale 17, of the reception of the B and C transmitter pulses B1, C1 after reception of the releated A pulse A1, shown coincident with zero instant on the timescale.

With the timings and transmitter spacings already quoted the maximum range of time-delay intervals for the pulse B1 lies between 4 and 36 micro-seconds, i. e. over the ranges B2, while the range within the operative quadrants $l$—$m$ and $n$—$o$ embraces 8 to 32 micro-seconds, i. e. over the range B3. Similarly the maximum range of the delay interval for the pulse C1 lies between 44 and 76 micro-seconds as shown at C2 while the operative range over the quadrants $l$—$n$ and $m$—$o$, lies between 48 and 72 micro-seconds as shown at C3.

Figure 2:
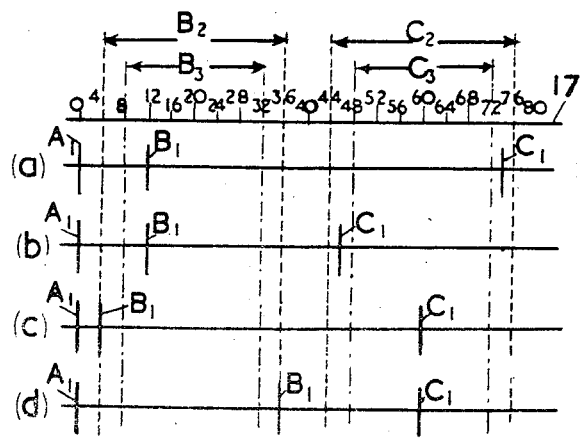

Diagram (a) Figure 2 shows the relative timedelays of pulses B1 and C1 for an object on the locus or course line $j$ in the quadrant $l$—$m$ as at 10 (Figure 1). In this instance the pulse B1 will lie within the operative quadrant range B3 at 12 micro-seconds and the pulse C1 will lie outside its operative quadrant range C3 at 74 micro-seconds i. e. near the maximum limit of its maximum range C2. In diagram (b), which shows the conditions applicable to a position such as 14 in the same course line $j$ but in the opposite quadrant $n$—$o$, the pulse B1 occurs as before at 12 microseconds but the pulse C1 is now located adjacent its minimum position at 46 micro-seconds. Diagrams (c) and (d) illustrate respectively the conditions applicable at positions such as 12 and 13. In each instance, the position of the pulse which is outside its operative quadrant range serves to resolve the ambiguity regarding the particular quadrant applicable to the other pulse which is within its operative quadrant range.

In consequence it is possible to give every bearing direction from the transmitter region or traffic centre, e. g. an airport as at 11, a particular characteristic pulse identification such as "B12, C max" for course line $j$ at 10, or "B12, C min" for course line $j$ at 14.

Figure 3 shows a network of beacon arrangements as above described located one at each end of a number of convenient traffic centres, U, V, W, X, Y and Z. Each of these beacon arrangements as above described has a common radio frequency of transmission but they have different pulse recurrence frequencies. By providing the mobile craft receiving equipment with suitable selective means adjustable so as to be responsive only to any chosen one of the different pulse recurrence frequencies, the navigator in such craft can choose the appropriate beacon for reception and, by maintaining the indicated time delay at the value appropriate to the direct course line leading thereto or therefrom, may navigate the craft along such course line.

One beacon arrangement is shown schematically in Figure 4 where 20 indicates a stable frequency local oscillator which controls, if necessary through suitable frequency dividing circuits not shown, the pulse recurrence frequency of transmission by application of its output to a pulse modulator circuit 21 which in turn controls the operation of a suitable pulse transmitter 22 energising an aerial 23 and forming the first or main transmitter i. e. transmitter A in Figure 1. The output from the pulse modulator circuit 21 is also fed by way of an adjustable delay device or phase-shifter 24 and landline 25 to a second or pulse transmitter 26 which corresponds to the satellite transmitter B above described and serves to radiate pulses forming counterparts to those of the transmitter 22 after a predetermined time-delay introduced by the circuit 24 and land line 25. The output from pulse modulator circuit 21 is similarly applied by way of a second delay device or phase-shifter 27 and land line 28 to a third transmitter 29 corresponding to the satellite transmitter C previously described whereby the latter radiates further counterpart pulses after a time-delay determined by circuit 27 and land line 28.

To facilitate setting up and monitoring of the appropriate delay times the output from the pulse modulator circuit 21 is also applied by way of a further and calibrated adjustable delay device 30, such as an ultrasonic cell, to a circuit 31 which operates as a "double-strobe gate" whereby conduction of an input signal therethrough may be effected for a predetermined short period over first one path followed immediately by conduction for a similar predetermined short period over a second path, change-over from one path to the other being effected at instants controlled by the incidence of the controlling pulses from delay device 30. The input signal to circuit 31 is provided by a suitable receiver 32 coupled to aerial 33 while the controlled output is applied to a centre-zero meter 34.

In the operation of this setting-up and monitoring apparatus the delay device 30 is set, by means of its calibrated control, to such a value that the aforesaid change-over instant coincides precisely with the correct instant of delayed arrival at the main transmitter, of the related counterpart pulse from one or the other of the satellite transmitters 26 or 29. Such delay-time will, of course, be equal to the sum of the chosen delay to be imposed by the appropriate delay device 24 or 27 and the associated land line 25 or 28 and the delay due to the radio transmission time required for the counterpart pulse to travel back to the main transmitter 22. The received signal output from the receiver 32 is applied by way of "gate" circuit 31 to the meter 34 in such manner that arrival of the received pulse during the conductive period but before the change-over operation of circuit 31 causes meter movement in one direction whereas the arrival of the signal during said conductive period but after the change-over operation causes movement in the opposite direction. Coincidence between the arrival of a signal and the change-over operation results in a state of balance with no meter movement. If the delay time is incorrect, the appropriate phase shifter 24 or 27 is adjusted to obtain a null indication on the meter 34. The total time period of each operative cycle of the circuit 31 during which it is conductive is quite short, i. e. of the order of a few microseconds only, so as to permit selection of the pulses from one satellite transmitter and the exclusion of the pulses from the other satellite transmitter.

Figure 5 illustrates an apparatus arrangement suitable for use in the mobile craft in conjunction with the beacon arrangements described above and comprises an aerial 40 feeding a suitable receiver 41 the output of which is applied to a selector unit 42 which contains a circuit adjustable to be responsive only to and capable of locking itself to one of a number of different pulse recurrence frequencies. This unit 42 provides a pulse output coincident with the reception of the first or A transmitter pulse of a sequence and which trips a variable delay circuit 43 which is linearly controllable in its delay time over a range of, say 4 to 80 micro-seconds, e. g. by means of a calibrated potentiometer or condenser. The delayed output of this circuit controls a "double-strobe gate" circuit 44 similar to that of the circuit 31 already described to which is also fed the output from the receiver 41 whereby the latter is directed in appropriate manner to a centre-zero meter 45 by way of a manually operable change-over switch 46. The pulse recurrence frequency selector unit 42 can be arranged to provide automatic gain control to the receiver 41 and, by suitable switching of the meter 45 the latter may be used as a tuning indicator.

The operation of this arrangement is similar to that already described in connection with the adjustment of the ground transmitter timing. The calibrated delay control of 43 is adjusted until a null indication is recorded on the meter 45 and a reading taken. Two such null positions should be available corresponding to the B and C delay times of the transmitter pulse signals. The course line and quadrant can then be determined either by references to a suitably marked chart showing the appropriate delay values for the beacon being used, or, when all beacons are of substantially identical form, by appropriate direct calibration of the control of the delay circuit 43. Alternatively the delay device 43 may be set at the value appropriate to a required course line and the mobile craft navigated by using the meter 45 as a "left-right" indicator. The switch 46 is provided, to be operated according to the quadrant in use and the direction of movement required, whereby the appropriate left or right direction of meter deflection movement is provided.

Instead of or in addition to providing a meter indication as above described, the mobile craft device may be adapted to provide an aural indication of coincidence or otherwise between the received counterpart signals and the time-delayed operation of the "gate-valve" circuit. Such aural indications may take the form of the known interlocking "A" and "N" Morse characters.

Figure 6 of the drawings illustrates schematically one manner of providing this facility. The units 40, 41, 42, 43, 44 and 45 correspond in nature and function to those already referred to in connection with Figure 5. In this instance, however, the output from the "double-strobe gate" valve circuit 44, which will change in polarity according to whether the selected received signals arrive before or after the circuit change-over instant, is applied to each of two control circuits 47a, 47b so arranged that one polarity of output from circuit 44 opens up one and closes the other and vice versa. Correct time coincidence, characterised by a zero mean output from circuit 44, allows each of the circuits 47a, 47b to be partly operative. These circuits 47a, 47b control respectively the supply of "A" and "N" Morse character signals from sources 48a, 48b to headphones or the like 49. The sources 48a, 48b are interlocked in the usual manner through the neutral tone source 48c whereby the steady tone, heard when coincidence of the change-over of circuit 44 with reception of a selected satellite transmitter pulses occurs, changes to either "A" or "N" signals when co-incidence is departed from.

The spacing between the ground transmitters may conveniently be of the order of 2 to 3 miles in which case a bearing accuracy of ±2 degrees should be readily obtainable through the 360° bearing range. The transmitter spacing may be reduced to the region of ¾ mile or less but with decreased accuracy. The radio transmission frequency employed is preferably 40 mc./s. or more.

The timing or phasing of the satellite transmitters B and C may be effected automatically at the main transmitter A by using two delay devices equivalent to the unit 30 of Figure 4, each controlling a separate "double strobe gate circuit" and by arranging the output from each of the latter to control a separate servo-motor coupled to the controlling element of the appropriate delay or phase shifting device 24, 27.

The arrangements above described are intended to provide bearing and homing information with the simplest possible equipment in the mobile craft. If desired however the system may be elaborated to provide speech communication between the beacon arrangement and the mobile craft and also to provide an indication at the mobile craft of its distance from the beacon.

Speech communication, e. g. for weather reports or traffic control purposes, may be provided by increasing the pulse recurrence frequency, to, say, 3000 per second and then modulating the pulse width of the main or "A" transmitter radiation according to the required speech transmission. By providing the mobile craft-apparatus with a further "gate" valve circuit opened at the instant of reception of the first or "A" transmitter pulse of each sequence, the selected "A" signals may be arranged to develop a voltage whose value is dependent upon the pulse width and which will, in consequence, carry the required speech modulation.

Figures 7 and 8 illustrate respectively in block schematic form one manner of modifying the main beacon transmitter and the mobile craft receiver to provide this facility. Referring first to Figure 7, the pulse modulator circuit 21 applies its controlling output to the transmitter 22 by way of a pulse-width controlling circuit 50 which, in turn, is controlled by the output of an amplifier 51 connected to a microphone 52. The circuit 50 is arranged, in known manner, to vary the width of the pulses passing therethrough in accordance with the speech modulation output of amplifier 51 while keeping the timing of the leading edges of each modulating pulse unaltered.

In the associated mobile craft receiver, shown in Figure 8, the pulse recurrence frequency selector unit 42, in addition to controlling the double-strobe gate 44, also controls a single strobe gate 53 which controls the supply of the receiver output to an integrating and filter circuit 54. The gate circuit 53 is normally closed or nonconductive but is arranged to become conductive for a short time period when triggered by a control voltage pulse from the unit 42. Its operative periods are arranged each to commence in synchronism with the arrival of the main transmitter pulses to which the unit 42 is locked. In consequence, each main or "A" transmitter pulse which is received is applied to the integrating and filtering unit 54 where the audio modulation is extracted and applied to headphones 49.

It will be understood that the various elements of the arrangements described in connection with the block schematic diagrams may be of any suitable and now well-known form, for example the delay devices may be of the ultrasonic cell type or of the artificial delay line form while the "double-strobe gate" circuits may be suitable modifications of the single stroke multi-vibrator or "flip-flop" type. The pulse transmitters and receivers will, of course, follow the usual form now well known in connection with radar equipment.

I claim:

1. A navigation system for mobile craft, such as aircraft, including a plurality of traffic centres each provided with a radio beacon arrangement, the beacon arrangement at each traffic centre comprising a first continuously operating pulse-modulated radio transmitter and at least one other transmitter having means for repeating the pulse signals radiated by said first transmitter after a predetermined and constant time-delay-interval, said transmitters being spaced around and in the vicinity of the centre to or from which traffic is required to be directed and positioned in close proximity within a central area which is small in comparison with the total area covered by the beacon so that there is set up in the space around said transmitters and outside said central area a series of substantially radial course lines each characterised by a particular value of time-interval between reception of a pulse from said first transmitter and reception of the repeated or counterpart pulse from said other transmitter, said first transmitter being provided with means for modulating the width of the transmitted pulse signals in accordance with a controlled voltage which varies in accordance with an intelligence carrying signal, such as a speech signal.

2. A navigation system for mobile craft, such as aircraft, including a plurality of traffic centres each provided with a radio beacon arrangement, the radio beacon arrangement at each traffic centre comprising a first continuously operating pulse-modulated radio transmitter and two other transmitters spaced around and in the vicinity of the centre to or from which traffic is required to be directed, said two other transmitters including means for repeating the pulse signals radiated by said first transmitter after predetermined and constant but respectively different delay-time-intervals, said transmitters being positioned in close proximity within a central area which is small in comparison with the total area covered by the beacon so that there is set up in the space around said transmitters and outside said central area a series of substantially radial course lines each characterized by a particular value of time-interval between reception of a pulse from said first transmitter and reception of the repeated or counterpart pulse from one or the other of said two other transmitters.

3. A navigation system according to claim 2 in which the three transmitters of each beacon arrangement are set up at the corners of a right-angled isosceles triangle and with the transmitter located at the right angle corner arranged for operation as the first transmitter.

4. A navigation system according to claim 3 in which all the transmitters of the radio beacon arrangements at said plurality of traffic centres operate on a common radio transmission frequency.

5. A navigation system according to claim 4 in which the transmitters of each beacon arrangement within a given area operate at different pulse-recurrence frequency than the transmitters of each other beacon arrangement within the same area.

6. A navigation system according to claim 2 in which all of the beacon arrangements have substantially identical lay-outs in respect of their transmitter spacing and orientation relative to magnetic north and in which course lines from each beacon arrangement having identical delay-time-intervals correspond to similar bearing angles.

7. A navigation system according to claim 2 in which the first transmitter of any radio beacon arrangement is provided with a pulse width modulator which modulates the width of the transmitted pulse signals in accordance with a control voltage which varies in accordance with an intelligence carrying signal, such as a speech signal.

8. A navigation system according to claim 2 in which the first transmitter of each radio beacon arrangement comprises a master oscillator for controlling the pulse modulation thereof and in which said master oscillator also controls the pulse modulation of the other two transmitters of the same group by way of land line links and delay networks.

9. A navigation system according to claim 8 in which said delay networks are adjustable and are located at the first transmitter.

10. A navigation system according to claim 9 in which the first transmitter is provided with means for receiving the counterpart pulses radiated by the other transmitters and for measuring the delay-times of such pulses.

ROBERT JAMES DIPPY.

REFERENCES CITED

The following references are of record in the file of this patent:

UNITED STATES PATENTS

| Number | Name | Date |
|---|---|---|
| 1,615,712 | Loth | Jan. 25, 1927 |
| 1,934,078 | Ludenia | Nov. 7, 1933 |
| 2,266,401 | Reeves | Dec. 16, 1941 |
| 2,403,626 | Wolff | July 9, 1946 |
| 2,407,287 | Labin | Sept. 10, 1946 |
| 2,408,048 | Deloraine | Sept. 24, 1946 |
| 2,413,694 | Dingley | Jan. 7, 1947 |
| 2,419,525 | Alford | Apr. 29, 1947 |
| 2,422,025 | Luck | June 10, 1947 |
| 2,422,100 | Huff | June 10, 1947 |
| 2,429,630 | Kandoian | Oct. 28, 1947 |
| 2,436,376 | Bown | Feb. 24, 1948 |
| 2,444,445 | Isbister | June 6, 1948 |

FOREIGN PATENTS

| Number | Country | Date |
|---|---|---|
| 866,695 | France | Mar. 31, 1941 |

OTHER REFERENCES

Ser. No. 429,583, De France (A. P. C.), published June 15, 1943.

Electronic Engineering, October 1945; pages 713 to 716.